Jan. 26, 1960　　　E. K. EISENBEISER　　　2,922,182
LOCATING MEANS FOR VEHICLE DOORS
Filed June 17, 1955　　　　　　　　　　　2 Sheets-Sheet 1

INVENTOR
ERICH K. EISENBEISER

BY　*Dicke and Craig.*

ATTORNEYS.

Jan. 26, 1960     E. K. EISENBEISER     2,922,182
LOCATING MEANS FOR VEHICLE DOORS

Filed June 17, 1955     2 Sheets-Sheet 2

INVENTOR
ERICH K. EISENBEISER

BY Dicke and Craig

ATTORNEYS

United States Patent Office 2,922,182
Patented Jan. 26, 1960

2,922,182
LOCATING MEANS FOR VEHICLE DOORS
Erich K. Eisenbeiser, Mannheim, Germany, assignor to Daimler-Benz Aktiengesellschaft, Stuttgart-Unterturkheim, Germany
Application June 17, 1955, Serial No. 516,191
Claims priority, application Germany June 18, 1954
5 Claims. (Cl. 16—82)

The present invention relates to locating and securing means for the doors of vehicles, and more particularly to the interengaging latch and catch provided on the door lock and door frame, respectively.

The accurate installation of such door locating and latching devices is often a difficult matter because of the yielding tendency and often insufficient resistance of car bodies to distortion which requires additional refitting, even though in the assembly of the car body the side walls thereof, and thus the door posts, might only be shifted or distorted very slightly. Furthermore, in operation, such door locating and latching means wear out very quickly by the frequent opening and closing of the doors, particularly if such opening and closing can be effected only by considerable force because the car body might have become slightly distorted which occurs quite easily especially in mountainous terrain. Even the distortion of the doors themselves may lead to an undue binding or wedging in their frames, while when used for a longer time they will no longer close tightly and cause troublesome rattling noise. Such motions wear out particularly the complementary locating and guiding means of the door latch and especially the locating walls of the catch in the door frame which are adapted to receive and guide such latch. The repair or replacement of these parts is, however, an expensive matter, often requiring welding operations which, in turn, require repainting of the car. This is true particularly since the tapered recess in the lock plate which is mounted in the door frame and adapted to receive and locate the latch on the door lock, and which is more easily and quickly worn than other parts, usually forms an integral part of the lock plate. Thus, even though only one wall of such tapered recess might be worn, the entire lock plate might have to be replaced or at least the worn wall would have to be rewelded and subsequently refinished. Such rewelding and refinishing is, however, not only very expensive but seldom done quite properly.

It is now an object of the present invention to eliminate the disadvantages of the door locating and latching devices known prior to this invention by providing simple means for compensating for the gaps between the door latch and the locating and guiding walls in the complimentary lock plate which may be caused by excessive wear upon these parts.

According to the present invention, this object is attained by designing at least one locating and guiding wall on the lock plate which is mounted on the door frame so as to form a separate element which may be adjusted relative to the door latch and secured in such adjusted position on a base plate which may constitute a part of the lock plate itself.

Further objects, features, and advantages of the present invention will be apparent from the following detailed description to be read with reference to the accompanying drawings, in which Fig. 1 shows a front view of a door lock equipped with locating and securing means according to the invention;

Fig. 4 shows a longitudinal cross section through the lock plate taken along line C—D of Fig. 3; while

Figure 1:
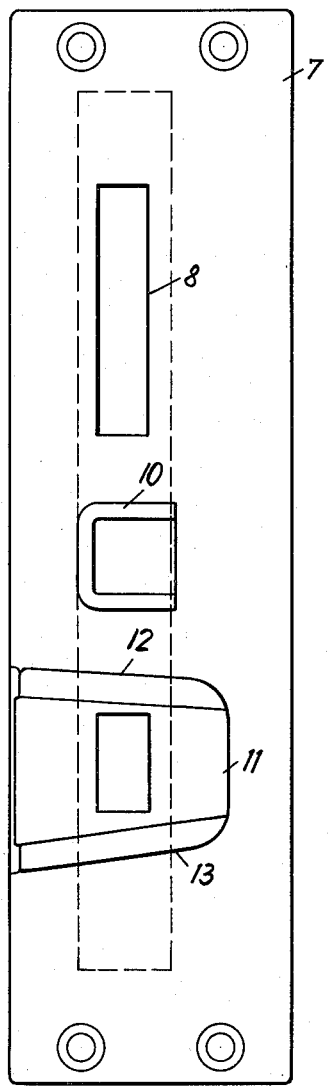
Figure 2:
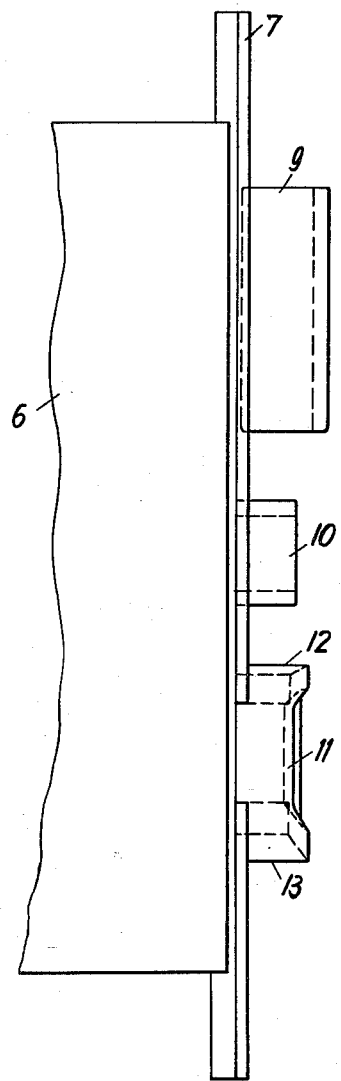
Fig. 2 is a side view thereof.
Figure 3:
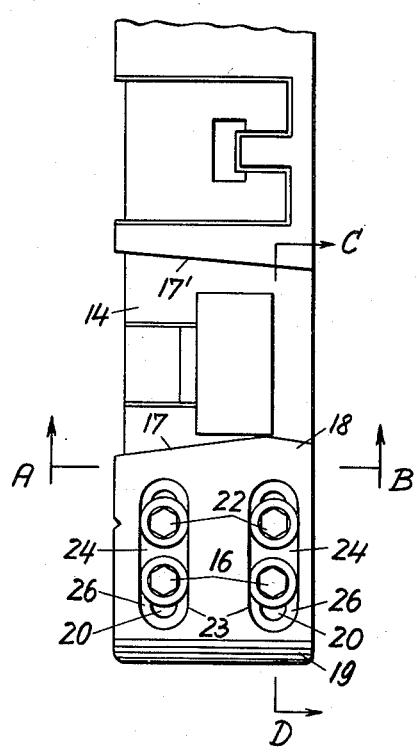
Fig. 3 shows the complementary lock plate which is adapted to receive the lock members shown in Figs. 1 and 2.

Referring to the drawings which illustrate one particular embodiment of the invention, Figs. 1 and 2 show a door lock, the locking members of which are adapted to engage into the lock plate 14 shown in Fig. 3. The door lock 6 has in its face plate 7 an aperture 8 for guiding the bolt 9 and below the bolt a U-shaped tripping device 10 which forms an integral portion of the face plate 7. The bolt 9 and the tripping device 10 engage with corresponding recesses in the door post 15. Below the tripping device 10, the lock 6 further includes the latch 11 which has tapered side surfaces 12 and 13. The latch 11 may be made integrally with the face plate 7 of the door lock 6 or may constitute a separate element suitably fastened to the plate 7.

Figure 4:
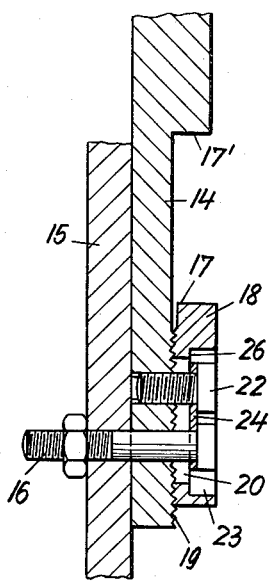
Figure 5:
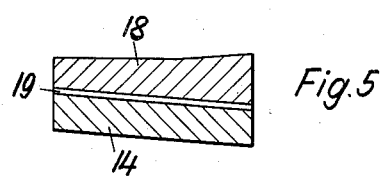
Fig. 5 shows a transverse cross section thereof taken along line A—B of Fig. 3.

The lock plate 14 is mounted by means of bolts on the door post 15 at a level in accordance with the position of the lock 6, the lower bolts being indicated in Figs. 3 and 4 by the numeral 16. Fig. 5 shows a cross section through the lock plate 14 taken alone line A—B of Figure 3. Below the holes for the upper mounting bolts (not shown) the upper part of lock plate 14 contains the apertures and supports for receiving the movable parts of the lock, the arrangement thereof being conventional and not forming a part of this invention, so that a more detailed description and showing thereof will not be necessary. The lower part of the lock plate is provided with the guiding and supporting walls 17 and 17' which are adapted to engage with the latch 11. In conformity with the lateral surfaces 12 and 13 of the latch 11, the lower wall 17 is more strongly tapered than the upper wall 17', and the rear part of the lower wall 17 is tapered in a conventional manner in the opposite direction so as to prevent any binding action of the latch 11 thereon.

The two guide walls 17 and 17' afford a positive adjustment of the door and its lock members relative to the door frame and the complementary parts which are mounted therein, and they also prevent the door from rattling. The severe stresses to which the latch 11 is subjected by the frequent opening and closing of the door and by the jarring of the car when driven over a rough road especially affect the lower guide wall 17 of the lock plate 14, and normally wear out such wall very quickly. Usually, if remedied at all, this requires a replacement of the entire lock plate. According to the invention, however, such wear of the lower wall surface 17 is compensated by making it adjustable in a vertical direction.

For this purpose, as shown in Figs. 4 and 5, the lower guide wall 17 does not form an integral portion of the lock plate 14 as is customary in the art, but it is designed as a separate element in the shape of a guide jaw 18 which is secured to the lock plate 14 by two bolts 22 and provided on its inner surface with serrations 19 which are adapted to interlock with corresponding serrations on the lock plate 14. The outer face of the guide jaw 18 is preferably provided with two recesses 23 and elongated slots 20 therein, both extending in a substantially vertical direction, that is, in the direction in which an adjustment of the guide jaw 18 relative to the upper tapered wall surface 17' may be carried out. To effect a more secure clamping action upon the guide jaw 18 the two bolts 22 are provided with washers 24 which rest upon the surfaces 26 of the recesses 23. The latter, as well as the slots 20, are preferably extended in a downward direction so as also to receive the lower mounting bolts 16. When installed and tightened, the outer surface of the heads of the adjusting bolts 22 and the mounting bolts 16 are located slightly below the outer surface of the guide jaw 18. It is advisable to use hexagon socket screws so as to render any tampering with the guide jaw 18 more difficult.

The serrations 19 both on the inner side of guide jaw 18 and on the lock plate 14 are preferably spaced closely together so as to permit a relatively fine adjustment of guide jaw 18. When installing the lock plate 14, the same is bolted to the door post by means of the upper and lower mounting bolts. After mounting the door on its hinges, the proper fit of the latch 11 relative to the cooperating surfaces 17 and 17' in the lock plate 14 is adjusted by means of the guide jaw 18 and by then tightening the adjusting bolts 22 as well as the lower mounting bolts 16. It is evident from this description that such adjustment of the main guiding wall 17 relative to the latch 11 is much easier and more apt to be accurate than the adjustment of a lock plate consisting of a single element. Also, if the guide walls 17 and 17' should become worn, it is a very simple matter to readjust them relative to each other. Such relative readjustment may be easily carried out by the owner of the car himself and without requiring any particular mechanical skill.

Although my invention has been illustrated and described with reference to the preferred embodiment thereof, I wish to have it understood that it is in no way limited to the details of such embodiments or to the specific examples described, but is capable of numerous modifications within the scope of the appended claims.

Having thus fully disclosed my invention, what I claim is:

1. In a vehicle having a door member and a door frame member, a device for locating and securing said door member relative to said frame member, said device comprising a projection on one member and a corresponding receiving element on said other member, said receiving element comprising a first part including a first guide wall, a second part constituting a mounting plate secured to said other member and including a second guide wall, said first part having at least one elongated slot and being manually movable independently on said mounting plate into various positions for locating and guiding said projection between said first and said second guide walls when said door member is being closed, a first bolt passing through said slot and mounting plate for securing said first and second parts together and upon said other member, and means comprising a second bolt passing through said slot and into said mounting plate for securing said first part to said mounting plate in the various adjusted positions thereof.

2. In a combination as defined in claim 1, wherein said bolts are provided with internal socket heads for tightening said bolts and for preventing tampering therewith after being tightened.

3. In a vehicle having a door member and a door frame member, a device for locating and securing said door member relative to said frame member, said device comprising a projection on one member and a corresponding receiving element on said other member, said receiving element comprising a first part including a first guide wall, a second part constituting a mounting plate secured to said other member and including a second guide wall, said first part having at least one elongated slot and being manually movable independently on said mounting plate into various positions for locating and guiding said projection between said first and said second guide walls when said door member is being closed, a first bolt passing through said slot and mounting plate for securing said first and second parts together and upon said other member, and means comprising a second bolt passing through said slot and into said mounting plate for securing said first part to said mounting plate in the various adjusted positions thereof, said first part including at least one grooved portion in the outer surface thereof, said slot being disposed within said grooved portion, said groove and slot extending in the direction of adjustment of said first part, the heads of said bolts being sunk within said groove.

4. In a vehicle having a door member and a door frame member, a device for locating and securing said door member relative to said frame member, said device comprising a projection on one member and a corresponding receiving element on said other member, said receiving element comprising a first part including a first guide wall, a second part constituting a mounting plate secured to said other member and including a second guide wall, said first part having at least one elongated slot and being manually movable independently on said mounting plate into various positions for locating and guiding said projection between said first and said second guide walls when said door member is being closed, a first bolt passing through said slot and mounting plate for securing said first and second parts together and upon said other member, and means comprising a second bolt passing through said slot and into said mounting plate for securing said first part to said mounting plate in the various adjusted positions thereof, said first part being provided with a plurality of serrations on the inner surface thereof, cooperating serrations on the outer surface of said mounting plate, said serrations on said two surfaces adapted to engage with each other, said first part having at least one grooved portion in the outer surface thereof, said elongated slot being disposed within said groove, said groove and said slot extending in the direction of adjustment of said first part.

5. In a vehicle having a door member and a door frame member, a device for locating and securing said door member relative to said frame member, said device comprising a projection on one member and a corresponding receiving element on said other member, said receiving element comprising a first part and a second part, at least the first part of said parts being movable independently of the second part and adapted to locate and guide said projection when said door member is being closed, and means for changing the position of said first part relative to said second part for adjusting the position of said first part relative to the position of said projection and for securing said first part to said second part, said second part of the receiving element including a mounting plate secured to said other member, said adjusting means of said first part comprising a plurality of serrations on the inner surface of said first part, cooperating serrations on the outer surface of said mounting plate of said second part, said serrations on said two surfaces adapted to engage with each other, said first part having a pair of grooved portions in the outer surface thereof, and an elongated slot within each of said grooves, said grooves and said slots extending in the direction of adjustment of said first part, and a plurality of bolts extending through said slots with their heads being sunk within said grooves for securing said first part to said mounting plate, and an additional mounting bolt passing through each of said grooves and slots, as well as through said mounting plate of the second part for securing said first part and said mounting plate of the second part to said other member.

References Cited in the file of this patent

UNITED STATES PATENTS

| 1,742,820 | Moore | Jan. 7, 1930 |
| 1,889,579 | Werner | Nov. 29, 1932 |
| 2,337,350 | Ryals | Dec. 21, 1943 |

FOREIGN PATENTS

| 721,716 | France | Dec. 23, 1931 |